United States Patent
Eguchi et al.

(10) Patent No.: US 9,708,681 B2
(45) Date of Patent: Jul. 18, 2017

(54) HIGH-STRENGTH SEAMLESS STEEL PIPE FOR OIL WELL USE HAVING EXCELLENT RESISTANCE TO SULFIDE STRESS CRACKING

(71) Applicant: JFE STEEL CORPORATION, Chiyoda-ku, Tokyo (JP)

(72) Inventors: Kenichiro Eguchi, Handa (JP); Yasuhide Ishiguro, Handa (JP); Yukio Miyata, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 168 days.

(21) Appl. No.: 14/366,545

(22) PCT Filed: Dec. 18, 2012

(86) PCT No.: PCT/JP2012/008073
§ 371 (c)(1),
(2) Date: Jun. 18, 2014

(87) PCT Pub. No.: WO2013/094179
PCT Pub. Date: Jun. 27, 2013

(65) Prior Publication Data
US 2014/0352836 A1 Dec. 4, 2014

(30) Foreign Application Priority Data

Dec. 22, 2011 (JP) ................................. 2011-280675

(51) Int. Cl.
*C22C 38/22* (2006.01)
*C22C 38/24* (2006.01)
(Continued)

(52) U.S. Cl.
CPC ............... *C21D 8/105* (2013.01); *C21D 1/25* (2013.01); *C21D 8/10* (2013.01); *C21D 9/085* (2013.01);
(Continued)

(58) Field of Classification Search
None
See application file for complete search history.

(56) References Cited

U.S. PATENT DOCUMENTS

| 8,845,830 B2 | 9/2014 | Kondo |
| 2012/0186704 A1 | 7/2012 | Eguchi et al. |

FOREIGN PATENT DOCUMENTS

| CA | 276608 | 12/2010 |
| CA | 2766028 | 12/2010 |

(Continued)

OTHER PUBLICATIONS

Machine-English translation of JP61-009519, Kaneko Teruo et al., Jan. 17, 1986.*

(Continued)

*Primary Examiner* — Deborah Yee
(74) *Attorney, Agent, or Firm* — RatnerPrestia

(57) ABSTRACT

A seamless steel pipe has a composition containing, by mass %, C: 0.15 to 0.50%, Si: 0.1 to 1.0%, Mn: 0.3 to 1.0%, P: 0.015% or less, S: 0.005% or less, Al: 0.01 to 0.1%, N: 0.01% or less, Cr: 0.1 to 1.7%, Mo: 0.40 to 1.1%, V: 0.01 to 0.12%, Nb: 0.01 to 0.08%, Ti: 0.03% or less, and B: 0.0005 to 0.003%, a structure composed of a tempered martensite phase as a main phase with a prior austenite grain size of 8.5 or more, and a hardness distribution in which in four portions 90° apart from each other in the circumferential direction, hardness is 295 HV10 or less in any one of an inner surface-side region at 2.54 to 3.81 mm from the inner surface of the pipe, an outer surface side-region at the same (Continued)

• : MEASUREMENT POINT distance from the outer surface of the pipe, and a center of the thickness.

24 Claims, 1 Drawing Sheet

(51) Int. Cl.

| | | |
|---|---|---|
| *C22C 38/26* | (2006.01) | |
| *C22C 38/28* | (2006.01) | |
| *C22C 38/32* | (2006.01) | |
| *C21D 8/10* | (2006.01) | |
| *F16L 9/02* | (2006.01) | |
| *C22C 38/54* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C21D 1/25* | (2006.01) | |
| *C22C 38/20* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C21D 9/08* | (2006.01) | |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F16L 9/02* (2013.01); *C21D 9/08* (2013.01); *C21D 2211/008* (2013.01); *C21D 2221/02* (2013.01)

(56) References Cited

FOREIGN PATENT DOCUMENTS

| | | |
|---|---|---|
| EP | 1008660 | 6/2000 |
| EP | 2006396 | 12/2008 |
| JP | 619519 | 1/1986 |
| JP | 05-287380 A | 11/1993 |
| JP | 5-287381 A | 11/1993 |
| JP | 07-166293 | 6/1995 |
| JP | 7-179941 A | 7/1995 |
| JP | 9-067624 A | 3/1997 |
| JP | 2000-219914 A | 8/2000 |
| JP | 2000297344 | 10/2000 |
| JP | 2002-060893 A | 2/2002 |
| RU | 2210604 | 8/2003 |
| WO | WO 2010/150915 A1 | 12/2010 |
| WO | 2011021396 | 2/2011 |

OTHER PUBLICATIONS

Machine-English translation of RU2210604 (C2)—Kuznetsov V Ju et al. Aug. 20, 2003.*
English abstract of JP358097409A, Aiyama, Shigeki, Jun. 9, 1983.*
English abstract of JP357094409A, Sakurada, Kazuyuki, Jun. 11, 1982.*
Extended European Search Report for European Patent Application No. 12859680.6-1362 mailed Dec. 9, 2014.
International Search Report dated Feb. 19, 2013, application No. PCT/JP2012/008073.
English translation of European Office Action for Application No. 12859680.6, dated May 31, 2016, 10 pages.

\* cited by examiner

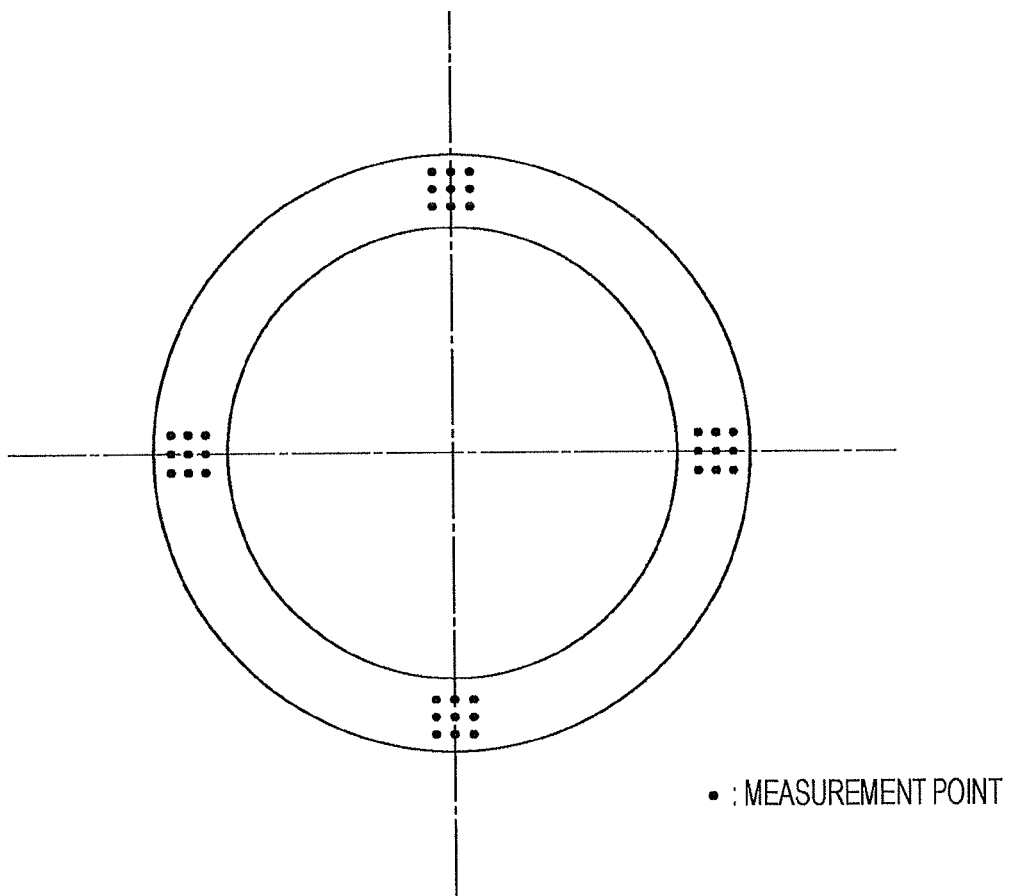

US 9,708,681 B2

HIGH-STRENGTH SEAMLESS STEEL PIPE FOR OIL WELL USE HAVING EXCELLENT RESISTANCE TO SULFIDE STRESS CRACKING

CROSS REFERENCE TO RELATED APPLICATIONS

This is the U.S. National Phase application of PCT/JP2012/008073, filed Dec. 18, 2012, which claims priority to Japanese Patent Application No. 2011-280675, filed Dec. 22, 2011, the disclosures of each of these applications being incorporated herein by reference in their entireties for all purposes.

FIELD OF THE INVENTION

Aspects of the present invention relate to a high-strength seamless steel pipe suitable for oil well use and particularly to improvement in resistance to sulfide stress cracking (SSC-resistance) in sour environments containing hydrogen sulfide. The term "high strength" represents strength of 110 ksi grade, i.e., represents the case of having a yield strength of 758 MPa or more and 862 MPa or less.

BACKGROUND OF THE INVENTION

In recent years, from the viewpoint of soaring oil prices and exhaustion of oil resources estimated in the near future, deep oil wells which have not been searched, oil wells and gas wells in severe corrosive environments under so-called sour environments have been actively developed. Oil country tubular goods use in such environments are required to include materials having both high strength and excellent corrosion resistance (sour resistance).

For this requirement, for example, Patent Literature 1 describes steel for oil country tubular goods having excellent resistance to sulfide stress cracking (SSC-resistance), the steel containing C: 0.15 to 0.35%, Si: 0.1 to 1.5%, Mn: 0.1 to 2.5%, P: 0.025% or less, S: 0.004% or less, sol. Al: 0.001 to 0.1%, Ca: 0.0005 to 0.005%, and a Ca-based non-metallic inclusion having a composition containing CaS and CaO in a total of 50% by mass or more and a Ca—Al compound oxide at less than 50% by mass, and the steel having hardness in a range of 21 to 30 HRC and a specified relation between the hardness and the total amount X (% by mass) of CaO and CaS. A technique described in Patent Literature 1 includes accelerating a reaction with harmless CaS and CaO by decreasing the amount of the Ca—Al compound oxide adverse to SSC-resistance, producing steel for oil well use having improved SSC-resistance.

Patent Literature 2 describes a method for producing a seamless steel pipe having small variation in strength and a microstructure with austenite grain size No. 6 or more according to ASTM standards, the method including piercing and hot-rolling a billet, forming a pipe under the condition of a finish rolling temperature of 900° C. to 1100° C. to produce a seamless steel pipe, and quenching the steel pipe while maintaining it in a temperature region equal to or higher than an Ar3 point and tempering, the billet having a composition containing C: 0.15 to 0.35%, Si: 0.1 to 1.5%, Mn: 0.1 to 2.5%, P: 0.03% or less, S: 0.005% or less, sol. Al: 0.001 to 0.1% or less, Cr: 0.1 to 1.5%, Mo: 0 to 1.0%, N: 0.0070% or less, V: 0 to 0.15%, B: 0 to 0.0030%, Ti: 0 to A % wherein A=3.4×N (%), and Nb: 0.005 to 0.012%. A technique described in Patent Literature 2 includes forming a microstructure by adjusting the steel composition and the finish rolling temperature, thereby decreasing strength variation.

In addition, Patent Literature 3 describes a method for producing a seamless steel pipe having high strength and high corrosion resistance. A technique described in Patent Literature 3 relates to a method for producing a seamless steel pipe by quenching and tempering a steel pipe and then applying plastic strain with a sectional plasticity rate of 10 to 90% to the steel pipe in a hot manner at 400° C. to 750° C., the steel pipe containing C: 0.30% or less, Si: 0.05 to 1.00%, Mn: 0.30 to 1.20%, S: 0.03% or less, Cr: 0.50 to 1.50%, Mo: 0.10 to 2.00%, Ni: 0.50% or less, and Cu: 0.10% or less. The technique described in Patent Literature 3 decreases the hardness of inner and outer surface layers of the steel pipe, which come into contact with a corrosive atmosphere, producing a seamless steel pipe satisfying both high strength and high corrosion resistance.

Patent Literature 4 describes steel having excellent resistance to sulfide cracking. A technique described in Patent Literature 4 includes controlling a composition to contain C: 0.01 to 0.10%, Si: 0.05 to 0.60%, Mn: 0.50 to 2.50%, P: 0.010% or less, S: less than 0.002%, Al: 0.005 to 0.100%, Ti: 0.005 to 0.020%, and Ca: 0.0005 to 0.0050%, and controlling micro Vickers hardness to 250 or less and a deviation in hardness in the thickness direction to 60 or less, improving the resistance to sulfide cracking of steel.

Patent Literature 5 describes a method for producing a high-strength corrosion-resistant steel pipe. A technique described in Patent Literature 5 includes quenching and tempering a steel pipe two times, the steel pipe containing C: 0.30% or less, Si: 0.05 to 1.00%, Mn: 0.30 to 1.00%, P: 0.03% or less, S: 0.03% or less, Cr: 0.30 to 1.50%, Mo: 0.10 to 2.00%, Al: 0.01 to 0.05%, and N: 0.015% or less, and further containing at least one of Nb: 0.01 to 0.04%, V: 0.03 to 0.10%, Ti: 0.01 to 0.05%, B: 0.0010 to 0.0050%, and Ca: 0.0010 to 0.0050%, wherein complete bend removal is performed in a cold or hot manner after first quenching and tempering, and slight or no bend removal is performed after second quenching and tempering, thereby producing a high-strength corrosion-resistant steel pipe having a small bend and a uniform hardness distribution of 110 ksi grade or more in the wall thickness direction.

[PTL 1] Japanese Unexamined Patent Application Publication No. 2002-60893
[PTL 2] Japanese Unexamined Patent Application Publication No. 2000-219914
[PTL 3] Japanese Unexamined Patent Application Publication No. 05-287380
[PTL 4] Japanese Unexamined Patent Application Publication No. 07-166293
[PTL 5] Japanese Unexamined Patent Application Publication No. 05-287381

SUMMARY OF THE INVENTION

However, various factors affecting SSC-resistance are very complicated, and in the present situation, conditions for stably securing SSC-resistance in high-strength steel pipes of 110 ksi grade are unclear. For example, in the technique described in Patent Literature 1, specific conditions of maximum hardness and forming inclusions useful for improving SSC-resistance are not specified. In addition, in the technique described in Patent Literature 2, only a difference between maximum hardness and minimum hardness is described, an absolute value of maximum hardness is not described, and specific conditions for securing SSC-resistance are not mentioned. In the technique described in Patent Literature 3, the SSC-resistance of a surface layer portion is improved, but the SSC-resistance of the steel pipe as a whole cannot be considered satisfactory. The technique described in Patent Literature 4 is capable of producing a steel pipe having YS of up to about 500 MPa grade but has the problem of difficulty in producing a steel pipe having strength higher than this order. The technique described in Patent Literature 5 requires two times repetition of quenching and tempering and includes bend-removal straightening between the two times of quenching and tempering, thereby causing the possibility of complicating the process and decreasing productivity.

An object in accordance with aspects of the present invention is to resolve the above-mentioned problems of related art and provide a high-strength seamless steel pipe having excellent resistance to sulfide stress cracking (SSC-resistance), which is suitable for oil well use. The expression "excellent resistance to sulfide stress cracking (SSC-resistance)" refers to a case where no cracking occurs with a applied stress of 85% of yield strength for a duration of over 720 hours in a constant-load test in a $H_2S$-saturated aqueous solution containing 0.5% acetic acid and 5.0% sodium chloride (liquid temperature: 24° C.) according to the standards of NACE TMO177 Method A.

In order to achieve the object, the inventors of the present invention intensively studied various factors affecting strength and resistance to sulfide stress cracking of a seamless steel pipe. As a result, it was found that in order to satisfy both desired high strength and excellent resistance to sulfide stress cracking in a seamless steel pipe for oil well use, the seamless steel pipe is required to contain Mo in an amount decreased to about 1.1% or less and necessarily contain Cr, V, Nb, and B in proper amounts, and have a hardness distribution in which Vickers hardness HV10 measured in an inner surface-side region at 2.54 to 3.81 mm from the inner surface of the pipe in the thickness direction, an outer surface-side region at 2.54 to 3.81 mm from the outer surface of the pipe in the thickness direction, and at a center of the thickness in each of four portions 90° separate from each other in the circumferential direction of the steel pipe is 295 HV10 or less at maximum (maximum hardness) at several positions in the circumferential direction of the steel pipe. Further, it was found that uniformity in the structure is important for this requirement.

Based on these findings, the present invention has been achieved by further investigation. That is, aspects of the present invention are as follows.

(1) A seamless steel pipe for oil well use having excellent resistance to sulfide stress cracking, the steel pipe having a composition containing, by mass %, C: 0.15 to 0.50%, Si: 0.1 to 1.0%, Mn: 0.3 to 1.0%, P: 0.015% or less, S: 0.005% or less, Al: 0.01 to 0.1%, N: 0.01% or less, Cr: 0.1 to 1.7%, Mo: 0.40 to 1.1%, V: 0.01 to 0.12%, Nb: 0.01 to 0.08%, Ti: 0.03% or less, B: 0.0005 to 0.003%, and the balance composed of Fe and inevitable impurities, wherein in four portions 90° apart from each other in the circumferential direction, Vickers hardness HV10 measured with a load of 10 kgf (test force: 98 MPa) is 295 HV10 or less at all three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness.

(2) The seamless steel pipe for oil well use described in (1), wherein the composition further contains, by mass %, one or two selected from Cu: 1.0% or less, and Ni: 1.0% or less.

(3) The seamless steel pipe for oil well use described in (1) or (2), wherein the composition further contains, by mass %, W: 2.0% or less.

(4) The seamless steel pipe for oil well use described in any one of (1) to (3), wherein the composition further contains, by mass %, Ca: 0.001 to 0.005%.

(5) The seamless steel pipe for oil well use described in any one of (1) to (4), wherein a wall thickness deviation is 8% or less.

(6) A method for producing a seamless steel pipe for oil well use having excellent resistance to sulfide stress cracking, the method including producing a seamless steel pipe with a predetermined shape by hot-working a steel pipe raw material having a composition containing, by mass %, C: 0.15 to 0.50%, Si: 0.1 to 1.0%, Mn: 0.3 to 1.0%, P: 0.015% or less, S: 0.005% or less, Al: 0.01 to 0.1%, N: 0.01% or less, Cr: 0.1 to 1.7%, Mo: 0.40 to 1.1%, V: 0.01 to 0.12%, Nb: 0.01 to 0.08%, Ti: 0.03% or less, B: 0.0005 to 0.003%, and the balance composed of Fe and inevitable impurities, cooling the seamless steel pipe to room temperature at a cooling rate equal to or higher than that of air cooling, further quenching and tempering the seamless steel pipe by reheating, and then performing hot straightened within a temperature range of 580° C. or more and a tempering temperature or less to produce a seamless steel pipe having a hardness distribution in which in four portions 90° apart from each other in the circumferential direction, Vickers hardness HV10 measured with a load of 10 kgf (test force: 98 MPa) is 295 HV10 or less at all three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness.

(7) The method for producing a seamless steel pipe for oil well use described in (6), wherein the steel pipe raw material is a steel slab formed by hot-rolling a cast slab.

(8) The method for producing a seamless steel pipe for oil well use described in (6) or (7), wherein the temperature of the steel pipe raw material in a heating furnace for hot working deviates within ±20° C. over the entire circumference and the entire length of the steel pipe raw material.

(9) The method for producing a seamless steel pipe for oil well use described in (6) or (7), wherein the temperature of a material to be rolled during hot working deviates within ±50° C. over the entire circumference and the entire length of the material to be rolled.

(10) The method for producing a seamless steel pipe for oil well use described in any one of (6) to (9), wherein the quenching and tempering are repeated two times or more.

(11) The method for producing a seamless steel pipe for oil well use described in any one of (6) to (9), wherein instead of the quenching and tempering, quenching is repeated two times, and then tempering is performed.

(12) The method for producing a seamless steel pipe for oil well use described in any one of (6) to (11), wherein the quenching includes reheating at a quenching temperature within a range of an $Ac_3$ transformation point to 1050° C., holding for 5 minutes or more, and then rapid cooling, and the tempering includes holding at a tempering temperature within a range of 630° C. to 730° C. for 10 minutes or more and then cooling.

(13) The method for producing a seamless steel pipe for oil well use described in any one of (6) to (12), wherein the composition further contains, by mass %, one or two selected from Cu: 1.0% or less, and Ni: 1.0% or less.

(14) The method for producing a seamless steel pipe for oil well use described in any one of (6) to (13), wherein the composition further contains, by mass %, W: 2.0% or less.

(15) The method for producing a seamless steel pipe for oil well use described in any one of (6) to (14), wherein the composition further contains, by mass %, Ca: 0.001 to 0.005%.

According to aspects of the present invention, it is possible to easily produce, at low cost, a high-strength seamless steel pipe having high strength of 110 ksi grade and excellent resistance to sulfide stress cracking in a severe corrosive environment containing hydrogen sulfide, thereby exhibiting significant industrial advantages.

BRIEF DESCRIPTION OF THE DRAWINGS

FIG. 1 is an explanatory view schematically showing measurement positions of cross-sectional hardness.

DETAILED DESCRIPTION OF EMBODIMENTS OF THE INVENTION

First, reasons for limiting a composition of a steel pipe of the present invention are described. Hereinafter, "mass %" is simply shown by "%" unless otherwise specified.

C: 0.15 to 0.50%

C has the function of increasing strength of steel and is an important element for securing desired high strength. In addition, C is an element for improving hardenability and contributes to the formation of a structure composed of a tempered martensite phase as a main phase. In order to achieve this effect, a content of 0.15% or more is required. On the other hand, with a content exceeding 0.50%, a large amount of carbides which function as hydrogen trap sites is precipitated during tempering, and thus it is impossible to hinder diffusible hydrogen from excessively entering steel and to suppress cracking during quenching. Therefore, the C content is limited to 0.15 to 0.50%. The C content is preferably 0.20 to 0.30%.

Si: 0.1 to 1.0%

Si is an element functioning as a deoxidizer and having the function of increasing steel strength by dissolution in steel and suppressing rapid softening during tempering. In order to achieve this effect, a content of 0.1% or more is required. On the other hand, with a content exceeding 1.0%, a coarse oxide-based inclusion is formed and thus functions as a strong hydrogen trap site and induces a decrease in amount of effective elements dissolved. Therefore, the Si content is limited to a range of 0.1 to 1.0%. The Si content is preferably 0.20 to 0.30%.

Mn: 0.3 to 1.0%

Mn is an element having the function of increasing steel strength through improvement in hardenability and of preventing grain boundary embrittlement due to S by bonding to S and fixing S as MnS. In the present invention a content of 0.3% or more is required. On the other hand, with a content exceeding 1.0%, cementite precipitated in grain boundaries is coarsened, decreasing the resistance to sulfide stress cracking. Therefore, the Mn content is limited to a range of 0.3 to 1.0%. The Mn content is more preferably 0.4 to 0.8%.

P: 0.015% or less

P shows the tendency to segregate in grain boundaries in a solid-solution state and to cause grain boundary embrittlement cracking or the like, and is thus preferably decreased in amount as much as possible. However, a content of up to 0.015% is permissible. Therefore, the P content is limited to 0.015% or less. The P content is more preferably 0.013% or less.

S: 0.005% or less

S is mostly present as sulfide-based inclusions in steel and decreases ductility, toughness, and corrosion resistance such as the resistance to sulfide stress cracking and the like. Although S may be partially present in a solid-solution state, but in this case, S shows the tendency to segregate in grain boundaries and cause grain boundary embrittlement cracking or the like, and is thus preferably decreased in amount as much as possible. However, an excessive decrease in amount rapidly increases smelting cost. Therefore, in the present invention, the S content is limited to 0.005% or less which has allowable adverse effects.

Al: 0.01 to 0.1%

Al functions as a deoxidizer and contributes to grain refining of austenite crystal grains by bonding to N to form AlN. In order to achieve this effect, an Al content of 0.01% or more is required. On the other hand, with an Al content exceeding 0.1%, amounts of oxide-based inclusions are increased, thereby decreasing toughness. Therefore, the Al content is limited to a range of 0.01 to 0.1%. The Al content is preferably 0.02 to 0.07%.

N: 0.01% or less

N bonds to nitride-forming elements such as Mo, Ti, Nb, Al, and the like to form MN-type precipitates. However, these precipitates decrease SSC-resistance and decrease amounts of MC and $M_2C$ precipitated during tempering, thereby making it impossible to expect desired higher strength. Thus, N is preferably decreased in amount as much as possible, and the N content is limited to 0.01% or less. Since the MN-type precipitates have the effect of suppressing coarsening of crystal grains during heating of a steel raw material and the like, the N content is preferably about 0.003% or more.

Cr: 0.1 to 1.7%

Cr is an element which contributes to an increase in steel strength through an increase in hardenability and improves corrosion resistance. In addition, Cr bonds to C to form $M_3C$-based, $M_7C_3$-based, and $M_{23}C_6$-based carbides and the like during tempering. In particular, the $M_3C$-based carbides improve the resistance to temper softening, decrease a change in strength due to tempering, and facilitate strength adjustment. In order to achieve this effect, a Cr content of 0.1% or more is required. On the other hand, with a Cr content exceeding 1.7%, large amounts of $M_7C_3$-based carbides and $M_{23}C_6$-based carbides are formed and function as hydrogen trap sites, thereby decreasing the resistance to sulfide stress cracking. Therefore, the Cr content is limited to a range of 0.1 to 1.7%. The Cr content is preferably 0.5 to 1.5% and more preferably 0.9 to 1.5%.

Mo: 0.40 to 1.1%

Mo forms carbides and contributes to an increase in strength by precipitation hardening and to further improvement in the resistance to sulfide stress cracking by segregation in prior-austenite grain boundaries. In addition, Mo has the function of densifying corrosion products and suppressing the formation and growth of pits serving as cracking initiation. In order to achieve this effect, a Mo content of 0.40% or more is required. On the other hand, with a Mo content exceeding 1.1%, needle-like $M_2C$-type precipitates and, in some cases, Laves phase ($Fe_2Mo$) are formed, thereby decreasing the resistance to sulfide stress cracking. Therefore, the Mo content is limited to a range of 0.40 to 1.1%. The Mo content is preferably 0.6 to 1.1%.

V: 0.01 to 0.12%

V is an element which forms a carbide or nitride and contributes to strengthening of steel. In order to achieve this effect, a V content of 0.01% or more is required. On the other hand, with a V content exceeding 0.12%, the effect is saturated, and an effect corresponding to the content cannot be expected, causing an economical disadvantage. Therefore, the V content is limited to a range of 0.01 to 0.12%. The V content is preferably 0.02 to 0.08%.

Nb: 0.01 to 0.08%

Nb delays recrystallization in an austenite ($\gamma$) temperature region to contribute to $\gamma$ grain refining, significantly functions in refining a martensite substructure (for example, a packet, a block, or a lath), and has the function of strengthening steel by forming a carbide. In order to achieve this effect, a Nb content of 0.01% or more is required. On the other hand, with a Nb content exceeding 0.08%, precipitation of coarse precipitates (NbC and NbN) is accelerated, resulting in a decrease in the resistance to sulfide stress cracking. Therefore, the Nb content is limited to a range of 0.01 to 0.08%. The Nb content is more preferably 0.02 to 0.06%. The packet is defined as a region composed of a group of laths arranged in parallel and having the same habit plane, and the block is composed of a group of parallel laths having the same orientation.

Ti: 0.03% or less

Ti is an element which forms a carbide or nitride and contributes to strengthening of steel. In order to achieve this effect, a Ti content of 0.01% or more is preferred. On the other hand, with a Ti content exceeding 0.03%, the formation of coarse TiN is accelerated during casting, and TiN is not dissolved even by subsequent heating, resulting in a decrease in toughness and resistance to sulfide stress cracking. Therefore, the Ti content is limited to a range of 0.03% or less. The Ti content is more preferably 0.01 to 0.02%.

B: 0.0005 to 0.003%

B is an element contributing to improvement in hardenability at a slight content, and in the present invention, a content of 0.0005% or more is required. On the other hand, even with a high content exceeding 0.003%, the effect is saturated, or conversely, a desired effect cannot be expected due to the formation of Fe—B boride, causing an economic disadvantage. In addition, with a content exceeding 0.003%, the formation of coarse borides such as $Mo_2B$, $Fe_2B$, and the like is accelerated, and thus cracking easily occurs during hot rolling. Therefore, the B content is limited to a range of 0.0005 to 0.003%. The B content is preferably 0.001 to 0.003%.

The above-described components are basic, but, if required, the basic composition may further contain at least one selected from Cu: 1.0% or less, Ni: 1.0% or less, W: 2.0% or less, and Ca: 0.001 to 0.005%.

Cu: 1.0% or less

Cu is an element having the function of increasing steel strength and improving toughness and corrosion resistance and can be added according to demand. In particular, when the strict resistance to sulfide stress cracking is required, Cu is a very important element. When added, Cu forms a dense corrosion product which suppresses the formation and growth of pits serving as crack initiation and thus significantly improves the resistance to sulfide stress cracking. Therefore, in the present invention, a content of 0.03% or more is preferred. On the other hand, even a content exceeding 1.0% leads to saturation of the effect and a cost rise. Therefore, the Cu content is preferably limited to 1.0% or less. The Cu content is more preferably 0.03 to 0.10%.

Ni: 1.0% or less

Ni is an element having the function of increasing steel strength and improving toughness and corrosion resistance, and can be added according to demand. In order to achieve the effect, a Ni content of 0.03% or more is preferred. However, even a content exceeding 1.0% leads to saturation of the effect and a cost rise. Therefore, the Ni content is preferably limited to 1.0% or less.

W: 2.0% or less

W forms carbides to contribute to strengthening of steel and can be added according to demand.

Like Mo, W forms carbides to contribute to an increase in strength due to precipitation hardening, and segregates, in a solid solution, in prior-austenite grain boundaries to contribute to improvement in the resistance to sulfide stress cracking. In order to achieve the effect, a content of 0.03% or more is preferred, while with a content exceeding 2.0%, the resistance to sulfide stress cracking is degraded. Therefore, the W content is preferably limited to 2.0% or less. The W content is more preferably 0.05 to 0.50%.

Ca: 0.001 to 0.005%

Ca is an element having the function of converting elongated sulfide-based inclusions into granular inclusions, i.e., the function of controlling the form of inclusions, and having the effect of improving ductility, toughness, and resistance to sulfide stress cracking through the control of the form of inclusions. Ca can be added according to demand. This effect becomes significant at a content of 0.001% or more, while with a content exceeding 0.005%, the amounts of nonmetallic inclusions are increased, and ductility, toughness, and resistance to sulfide stress cracking are rather decreased. Therefore, the Ca content is preferably limited to a range of 0.001 to 0.005%.

The balance excluding the above-described components is composed of Fe and inevitable impurities.

Next, the steel pipe according to aspects of the present invention has the above-described composition and also has a structure containing a tempered martensite phase as a main phase and prior-austenite grains with grain size No. 8.5 or more.

In order to secure a high strength of 110 ksi grade at relatively low contents of alloy elements without containing large amounts of alloy elements, the steel pipe of the present invention has a martensite phase structure but from the viewpoint of securing desired toughness, ductility, and resistance to sulfide stress cracking, the structure is composed of a tempered martensite phase as a main phase formed by tempering the martensite phase. The "main phase" refers to a structure including a tempered martensite single phase or containing the tempered martensite phase and a second phase at less than 5% by volume within a range having no influence on characteristics. When the content of the second phase is 5% or more, strength and further toughness, ductility, and the like are degraded. Examples of the second phase include bainite, pearlite, ferrite, a mixed phase thereof, and the like. Therefore, the "structure composed of a tempered martensite as a main phase" represents a structure containing 95% by volume or more of tempered martensite phase.

In addition, the steel pipe according to aspects of the present invention has the structure containing prior-austenite ($\gamma$) grains with a grain size number of 8.5 or more. A value measured according to JIS G 0551 standards is used as the prior $\gamma$-grain size number. With the grain size No. of prior $\gamma$ grains of less than 8.5, a martensite phase substructure produced by transformation from a γ phase is coarsened, and the desired resistance to sulfide stress cracking cannot be secured.

In addition, the steel pipe according to aspects of the present invention is characterized in that as shown in FIG. 1, in four portions 90° apart from each other in the circumferential direction, Vickers hardness HV10 measured with a load of 10 kgf (test force: 98 MPa) is 295 HV10 or less at all three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness. That is, the steel pipe according to aspects of the present invention has hardness of 295 HV10 at a maximum in at least the three positions in each of the inner surface side, the outer surface side, and the center of the thickness. When the hardness exceeds 295 HV10 at any one of the measurement positions in each of the three regions in the thickness direction, the resistance to sulfide stress cracking is degraded. In order to uniformly produce the steel pipe having excellent resistance to sulfide stress cracking, it is an essential requirement that the hardness is 295 HV10 or less at all measurement positions in each of the three regions in the thickness direction.

Next, a preferred method for producing a steel pipe of the present invention is described.

A steel pipe raw material having the above-described composition is used as a starting material, and the steel pipe raw material is heated in a predetermined temperature range and then hot-worked to form a seamless steel pipe with predetermined dimensions.

In accordance with aspects of the present invention, a method for producing the steel pipe raw material having the above-described composition need not be particularly limited, but it is preferred that molten steel having the above-described composition is refined by a usual known refining method using a converter, an electric furnace, a vacuum melting furnace, or the like and formed into a cast slab such as a billet by a usual known continuous casting method. The cast slab is preferably further subjected to hot working such as rolling by heating to form a steel slab. This is effective in making uniform the structure of the resultant steel pipe raw material and in adjusting the hardness of a steel pipe to 295 HV10 or less. Also, instead of the continuous casting method, an ingot making-blooming method for producing the steel pipe raw material causes no problem.

The steel pipe raw material is preferably heated to a temperature in a range of 1000° C. to 1350° C. With a heating temperature of lower than 1000° C., carbides are not sufficiently molten. On the other hand, with a heating temperature exceeding 1350° C., excessive coarsening of crystal grains causes coarsening of cementite on prior austenite (γ) grain boundaries and significant concentration (segregation) of impurity elements such as P, S, and the like on the grain boundaries, thereby embrittling the grain boundaries and easily producing grain boundary fracture. In view of productivity, the holding time at the temperature is preferably 4 hours or less.

In addition, the steel pipe raw material is preferably held under heating in the heating furnace for hot working so as to have a temperature distribution within ±20° C. over the entire circumference and the entire length. When the temperature distribution of the steel pipe raw material during heating is out of the range, variation occurs in the structure of the steel pipe after hot working, and a desired uniform hardness distribution cannot be secured after quenching and tempering.

The heated steel pipe raw material is then formed into a pipe by hot working using a usual Mannesmann-plug mill or Mannesmann-mandrel mill manufacturing process, producing the seamless steel pipe with predetermined dimensions. The seamless steel pipe may be produced by press-type hot extrusion. After pipe making, the seamless steel pipe is cooled to room temperature at a cooling rate equal to higher than that of air cooling. During hot working, the temperature of the material to be rolled (steel pipe raw material) preferably deviates within ±50° C. over the entire circumference and the entire length of the material to be rolled. When the temperature of the material to be rolled during rolling is out of the range, variation occurs in the structure of the steel pipe after hot working, and a desired uniform hardness distribution cannot be secured after quenching and tempering.

By controlling the temperature of the steel pipe raw material or the material to be rolled as described above, the wall thickness derivation of the resultant steel pipe can be adjusted to 8% or less. The wall thickness deviation is calculated using the following expression:

Wall thickness deviation=(maximum wall thickness−minimum wall thickness)/(average wall thickness)

In order to stabilize the material and make the structure uniform, the seamless steel pipe after hot working is quenched by reheating and rapid cooling (water cooling) and is further tempered. The quenching and tempering are preferably repeated two times or more. The quenching may be repeated two times or more, and then the tempering may be performed. By repeating quenching and tempering two times or more or repeating quenching two times or more, the structure becomes more uniform, thereby decreasing the maximum hardness and significantly increasing the resistance to sulfide stress cracking.

In accordance with aspects of the present invention, quenching is a process including reheating to a quenching temperature of an $Ac_3$ transformation point or more and 1050° C. or less, preferably 830° C. to 940° C., and then rapid cooling (water cooling) from the quenching temperature to a temperature range of a Ms transformation point or less, preferably 100° C. or less. This can result in a structure composed of a martensite phase as a main phase having a fine substructure transformed from a fine γ phase. Heating at the quenching temperature lower than the $Ac_3$ transformation point cannot produce an austenite single phase and then cannot sufficiently produce the martensite structure by subsequent cooling, and thus desired strength cannot be secured. Therefore, the heating temperature for quenching is preferably limited to the $Ac_3$ transformation point or more. On the other hand, quenching at a high temperature exceeding 1050° C. causes coarsening of the structure and decreases toughness and resistance to sulfide stress cracking.

In addition, cooling from the quenching heating temperature is preferably water cooling at 2° C./s or more and is performed to a temperature region of the Ms transformation point or less, preferably 100° C. or less. As a result, a satisfactory hardened structure (95% by volume or more of martensite structure) can be formed. In addition, the holding time at the quenching temperature is 5 minutes or more and preferably 10 minutes or less. Consequently, the structure becomes more uniform, and the maximum hardness in a section of the steel pipe can be stably adjusted to 295 HV10 or less.

The seamless steel pipe quenched is then tempered.

In accordance with aspects of the present invention, tempering is performed for attempting to stabilize the structure by decreasing excessive dislocation and for imparting both desired high strength and excellent resistance to sulfide stress cracking.

The tempering temperature is preferably a temperature within a temperature range of 630° C. to 730° C. With the tempering temperature deviating to the lower side from the range, the number of hydrogen trap sites such as dislocations is increased, and the resistance to sulfide stress cracking is degraded. While with the tempering temperature deviating to the higher side from the range, the structure is significantly softened, and thus desired high strength cannot be secured. In addition, amounts of needle-like $M_2C$-type precipitates are increased, degrading the resistance to sulfide stress cracking. The tempering is preferably a process including holding at a temperature within the above-described range for 10 minutes or more and then cooling to room temperature at a cooling rate preferably equal to or higher than that of air cooling. When the holding time at the tempering temperature is less than 10 minutes, a desired uniform structure cannot be achieved. The holding time is preferably 80 minutes or less. With an excessively long tempering holding time, a Laves phase ($Fe_2Mo$) is precipitated.

After the quenching and tempering, straightening is performed for straightening failures in the shape of the steel pipe and for decreasing variation in hardness. The straightening is hot-straightening performed in a temperature range of 580° C. or more and the tempering temperature or less. Cold-straightening performed at room temperature increases the dislocation density and thus cannot improve the resistance to sulfide stress corrosion cracking. This applies to straightening performed within a low temperature region of less than 580° C. In addition, straightening within a high temperature region beyond the tempering temperature decreases strength. The straightening is preferably performed so that a sectional plasticity rate is 1% or more and less than 10%. With a sectional plasticity rate of less than 1%, the effect of straightening is unsatisfactory. On the other hand, with a sectional plasticity rate of 10% or more, plastic deformation is applied, thereby increasing the density of dislocations serving as hydrogen trap sources and decreasing SSC-resistance.

Embodiments of the present invention are described in further detail below based on examples.

EXAMPLES OF THE INVENTION

Molten steel having each of the compositions shown in Table 1 was refined with a converter and formed into a cast slab by a continuous casting method. The cast slab was used as a steel pipe raw material and hot-worked by a Mannesmann-plug mill-type production process to produce a pipe as a seamless steel pipe with dimensions shown in Table 2, and then the pipe was air-cooled to room temperature. Then, the as-hot-worked seamless steel pipe was quenched by reheating to the quenching temperature shown in Table 2 and water cooling, and then tempered under conditions shown in Table 2. Then, straightening was performed at a temperature shown in Table 2.

A specimen was taken from each of the resulting steel pipes and a structure observation test, a tensile test, a cross-sectional hardness test, and a corrosion test were carried out. The test methods were as follows.

(1) Structure Observation Test

A specimen for structure observation was taken from each of the steel pipes, and a section (C section) perpendicular to the longitudinal direction of the pipe was polished and then corroded (etching solution: nital liquid), and the structure was observed with an optical microscope (magnification: 1000 times) and a scanning electron microscope (magnification: 2000 times) and imaged to measure the type and fraction of the structure with an image analyzer.

Further, prior γ grain boundaries were exposed by corrosion with a picral etching solution, and the resulting structure was observed in three fields of view with an optical microscope (magnification: 1000 times) to determine the grain size number of prior-γ grains using a cutting method according to the JIS G 0551 standards.

(2) Cross-Sectional Hardness Test

As shown in FIG. 1, in four portions 90° apart from each other in the circumferential direction at a position of 400 mm from an end of each of the resulting steel pipes, Vickers hardness HV10 was measured with a load of 10 kgf (test force: 98 MPa) at three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness. The measurement positions were three positions in each of the regions. The measured values were averaged to determine an arithmetic average as average hardness HV10, and maximum hardness HV10 of each steel pipe was determined.

(3) Corrosion Test

Ten corrosion test specimens were taken from each of the steel pipes, and a constant-load test was conducted in a $H_2S$-saturated aqueous solution containing 0.5% acetic acid and 5.0% sodium chloride (liquid temperature: 24° C.) according to the standards of NACE TM0177 Method A. After loading with a load stress of 85% of yield strength for 720 hours, the presence of cracking in the specimens was observed to evaluate resistance to sulfide stress cracking. The cracking was observed using a projector with a magnification of 10 times. The resistance to sulfide stress cracking was evaluated from incidence of cracking (=(number of cracked specimens)/(total number of specimens)×100(%)).

The obtained results are shown in Table 3.

TABLE 1

| Steel No. | Chemical composition (mass %) | | | | | | | | | | | | | | | Remarks |
|---|---|---|---|---|---|---|---|---|---|---|---|---|---|---|---|---|
| | C | Si | Mn | P | S | Al | N | Cr | Mo | V | Nb | B | Cu, Ni | Ti, W | Ca | |
| A | 0.25 | 0.25 | 1.0 | 0.015 | 0.0020 | 0.040 | 0.0028 | 0.50 | 0.01 | — | — | 0.0025 | — | Ti: 0.01 | — | Comparative Example |
| B | 0.25 | 0.25 | 0.6 | 0.010 | 0.0007 | 0.025 | 0.0040 | 1.0 | 0.99 | 0.03 | 0.03 | 0.0020 | — | Ti: 0.02 | 0.002 | Adaptation Example |
| C | 0.25 | 0.27 | 0.6 | 0.010 | 0.0007 | 0.028 | 0.0027 | 1.3 | 0.80 | 0.03 | 0.05 | 0.0021 | Cu: 0.10, Ni: 0.05 | Ti: 0.02 | 0.002 | Adaptation Example |
| D | 0.25 | 0.26 | 0.6 | 0.011 | 0.0007 | 0.027 | 0.0030 | 1.0 | 0.80 | 0.03 | 0.05 | 0.0021 | — | Ti: 0.02, W: 0.3 | 0.002 | Adaptation Example |
| E | 0.24 | 0.26 | 0.5 | 0.008 | 0.0014 | 0.034 | 0.0030 | 1.0 | 0.27 | — | 0.03 | 0.0021 | — | Ti: 0.01 | 0.002 | Comparative Example |

TABLE 1-continued

| Steel No. | Chemical composition (mass %) | | | | | | | | | | | | | | | Remarks |
|---|---|---|---|---|---|---|---|---|---|---|---|---|---|---|---|---|
| | C | Si | Mn | P | S | Al | N | Cr | Mo | V | Nb | B | Cu, Ni | Ti, W | Ca | |
| F | 0.25 | 0.25 | 1.0 | 0.015 | 0.0020 | 0.040 | 0.0050 | 1.5 | 0.95 | 0.03 | 0.03 | 0.0025 | — | Ti: 0.02 | — | Adaptation Example |
| G | 0.26 | 0.26 | 0.6 | 0.010 | 0.0007 | 0.029 | 0.0033 | 1.3 | 0.79 | 0.07 | 0.05 | 0.0017 | Cu: 0.05 | Ti: 0.02 | 0.003 | Adaptation Example |
| H | 0.25 | 0.25 | 0.6 | 0.010 | 0.0007 | 0.027 | 0.0031 | 1.3 | 0.81 | 0.03 | 0.05 | 0.0020 | Cu: 0.05 | Ti: 0.02 | 0.002 | Adaptation Example |
| I | 0.24 | 0.26 | 0.5 | 0.008 | 0.0013 | 0.033 | 0.0031 | 1.1 | 0.37 | 0.02 | 0.03 | 0.0020 | — | Ti: 0.02 | 0.002 | Comparative Example |
| J | 0.26 | 0.25 | 0.6 | 0.010 | 0.0007 | 0.027 | 0.0039 | 1.3 | 0.81 | — | 0.05 | 0.0020 | — | Ti: 0.02 | 0.002 | Comparative Example |
| K | 0.27 | 0.27 | 0.4 | 0.006 | 0.0013 | 0.072 | 0.0035 | 0.7 | 0.70 | 0.05 | — | 0.0023 | — | Ti: 0.02 | 0.002 | Comparative Example |
| L | 0.25 | 0.27 | 0.6 | 0.010 | 0.0007 | 0.028 | 0.0027 | 1.3 | 0.80 | 0.03 | 0.05 | 0.0021 | — | Ti: 0.02 | — | Adaptation Example |
| M | 0.25 | 0.27 | 0.6 | 0.010 | 0.0007 | 0.028 | 0.0027 | 1.3 | 0.97 | 0.03 | 0.05 | 0.0021 | — | Ti: 0.02 | — | Adaptation Example |
| N | 0.25 | 0.27 | 0.6 | 0.010 | 0.0007 | 0.028 | 0.0027 | 1.0 | 0.97 | 0.03 | 0.05 | 0.0021 | — | Ti: 0.02 | — | Adaptation Example |

TABLE 2

| Steel pipe No. | Steel No. | Dimensions of steel pipe | | Hot-working conditions | | Heat treatment conditions | | | |
|---|---|---|---|---|---|---|---|---|---|
| | | | | Temperature difference in heating furnace | Temperature difference during rolling | Quenching Q | | Tempering T | |
| | | (Outer diameter mmφ × wall thickness mm) | Wall thickness deviation (%) | (° C.) (maximum-minimum) | (° C.) (maximum-minimum) | Quenching temp. (° C.) | Holding time (min) | Tempering temp. (° C.) | Holding time (min) |
| 1 | A | 178φ × 22.2 | 7 | 16 | 48 | 920 | 5 | 675 | 20 |
| 2 | B | 178φ × 22.2 | 5 | 13 | 33 | 920 | 5 | 700 | 30 |
| 3 | C | 178φ × 22.2 | 4 | 17 | 36 | 920 | 5 | 720 | 30 |
| 4 | D | 178φ × 22.2 | 6 | 7 | 19 | 920 | 5 | 700 | 30 |
| 5 | E | 178φ × 22.2 | 4 | 13 | 30 | 920 | 5 | 690 | 20 |
| 6 | C | 178φ × 22.2 | 3 | 17 | 39 | 890 | 5 | 625 | 80 |
| 7 | C | 178φ × 22.2 | 4 | 13 | 48 | 1100 | 10 | 685 | 80 |
| 8 | C | 178φ × 22.2 | 6 | 17 | 42 | 890 | 5 | 710 | 80 |
| 9 | F | 178φ × 22.2 | 4 | 17 | 30 | 920 | 5 | 700 | 30 |
| 10 | G | 178φ × 22.2 | 7 | 7 | 22 | 910 | 5 | 685 | 80 |
| 11 | H | 178φ × 22.2 | 4 | 13 | 27 | 890 | 5 | 685 | 80 |
| 12 | I | 178φ × 22.2 | 6 | 6 | 42 | 920 | 5 | 675 | 60 |
| 13 | J | 178φ × 22.2 | 5 | 18 | 42 | 890 | 5 | 675 | 80 |
| 14 | K | 178φ × 22.2 | 7 | 7 | 41 | 920 | 5 | 690 | 30 |
| 15 | L | 215.9φ × 31.8 | 5 | 17 | 27 | 870 | 5 | 675 | 30 |
| 16 | L | 215.9φ × 31.8 | 4 | 17 | 27 | 870 | 5 | 660 | 80 |
| 17 | L | 215.9φ × 31.8 | 3 | 14 | 39 | 870 | 5 | 660 | 80 |
| 18 | L | 244.5φ × 15.5 | 5 | 17 | 24 | 870 | 5 | 695 | 30 |
| 19 | L | 244.5φ × 15.5 | 3 | 15 | 29 | 870 | 5 | 685 | 30 |
| 20 | L | 244.5φ × 15.5 | 6 | 14 | 43 | 870 | 5 | 685 | 30 |
| 21 | M | 215.9φ × 31.8 | 3 | 10 | 32 | 870 | 5 | 660 | 30 |
| 22 | N | 215.9φ × 31.8 | 7 | 13 | 37 | 870 | 5 | 660 | 80 |
| 23 | N | 215.9φ × 31.8 | 15 | 13 | 37 | 870 | 5 | 660 | 80 |
| 24 | N | 215.9φ × 31.8 | 7 | 25 | 37 | 870 | 5 | 660 | 80 |
| 25 | N | 215.9φ × 31.8 | 7 | 13 | 55 | 870 | 5 | 660 | 80 |
| 26 | L | 244.5φ × 15.5 | 6 | 16 | 26 | 870 | 5 | — | — |

| Steel pipe No. | Heat treatment conditions | | | | | straightening | | Remarks |
|---|---|---|---|---|---|---|---|---|
| | Quenching Q | | Tempering T | | | | | |
| | Quenching temp. (° C.) | Holding time (min) | Tempering temp. (° C.) | Holding time (min) | Repetition | Temp. (° C.) | Sectional plasticity rate (%) | |
| 1 | — | — | — | — | QT | 585 | 5 | Comparative Example |
| 2 | — | — | — | — | QT | 610 | 1 | Example of this invention |
| 3 | — | — | — | — | QT | 620 | 5 | Example of this invention |
| 4 | — | — | — | — | QT | 610 | 9 | Example of this invention |
| 5 | — | — | — | — | QT | 595 | 5 | Comparative Example |
| 6 | — | — | — | — | QT | 530 | 1 | Comparative Example |
| 7 | — | — | — | — | QT | 590 | 5 | Comparative Example |
| 8 | — | — | — | — | QT | 615 | 9 | Example of this invention |
| 9 | — | — | — | — | QT | 605 | 1 | Example of this invention |
| 10 | — | — | — | — | QT | 590 | 5 | Example of this invention |
| 11 | — | — | — | — | QT | 585 | 9 | Example of this invention |
| 12 | — | — | — | — | QT | 585 | 5 | Comparative Example |
| 13 | — | — | — | — | QT | 585 | 5 | Comparative Example |
| 14 | — | — | — | — | QT | 590 | 5 | Comparative Example |
| 15 | — | — | — | — | QT | 550 | 5 | Comparative Example |

TABLE 2-continued

| | | | | | | | | |
|---|---|---|---|---|---|---|---|---|
| 16 | — | — | — | — | QT | 585 | 5 | Example of this invention |
| 17 | — | — | — | — | QT | 560 | 5 | Comparative Example |
| 18 | 870 | 5 | 700 | 30 | QTQT | 595 | 5 | Example of this invention |
| 19 | — | — | — | — | QT | 605 | 5 | Example of this invention |
| 20 | — | — | — | — | QT | 565 | 5 | Comparative Example |
| 21 | — | — | — | — | QT | 585 | 5 | Example of this invention |
| 22 | — | — | — | — | QT | 585 | 5 | Example of this invention |
| 23 | — | — | — | — | QT | 585 | 5 | Comparative Example |
| 24 | — | — | — | — | QT | 585 | 5 | Comparative Example |
| 25 | — | — | — | — | QT | 585 | 5 | Comparative Example |
| 26 | 870 | 5 | 700 | 30 | QQT | 595 | 5 | Example of this invention |

TABLE 3

| | | Structure | | | Tensile properties | | Cross-sectional hardness HV10 | | | SSC resistance | |
|---|---|---|---|---|---|---|---|---|---|---|---|
| | | Prior γ | | Fraction of second | | | | Average | | Incidence | |
| Steel pipe No. | Steel No. | grain size No. | Type* | phase (volume %) | YS (MPa) | TS (MPa) | Maximum | Outer surface side** | Center of thickness | Inner surface side** | of cracking (%) | Remarks |
| 1 | A | 8.0 | TM + B | B: 1.0 | 658 | 765 | 264 | 244 | 250 | 240 | 100 | Comparative Example |
| 2 | B | 11.0 | TM + B | B: 1.0 | 817 | 903 | 293 | 288 | 281 | 269 | 0 | Example of this invention |
| 3 | C | 11.0 | TM + B | B: 1.0 | 777 | 868 | 288 | 276 | 280 | 272 | 0 | Example of this invention |
| 4 | D | 11.0 | TM + B | B: 1.0 | 834 | 915 | 292 | 286 | 289 | 287 | 0 | Example of this invention |
| 5 | E | 11.0 | TM + B | B: 1.0 | 707 | 800 | 275 | 258 | 254 | 259 | 100 | Comparative Example |
| 6 | C | 11.0 | TM + B | B: 1.0 | 995 | 1075 | 335 | 318 | 318 | 319 | 100 | Comparative Example |
| 7 | C | 8.0 | TM + B | B: 1.0 | 770 | 878 | 283 | 270 | 278 | 269 | 100 | Comparative Example |
| 8 | C | 11.0 | TM + B | B: 1.0 | 774 | 865 | 284 | 265 | 278 | 280 | 0 | Example of this invention |
| 9 | F | 11.0 | TM + B | B: 1.0 | 803 | 904 | 294 | 287 | 282 | 283 | 0 | Example of this invention |
| 10 | G | 11.0 | TM + B | B: 1.0 | 794 | 881 | 293 | 276 | 283 | 268 | 0 | Example of this invention |
| 11 | H | 11.0 | TM + B | B: 1.0 | 832 | 917 | 293 | 281 | 282 | 278 | 0 | Example of this invention |
| 12 | I | 11.0 | TM + B | B: 1.0 | 724 | 816 | 275 | 260 | 265 | 264 | 100 | Comparative Example |
| 13 | J | 11.0 | TM + B | B: 1.0 | 849 | 939 | 306 | 296 | 302 | 294 | 100 | Comparative Example |
| 14 | K | 8.0 | TM + B | B: 1.0 | 883 | 928 | 310 | 296 | 304 | 293 | 100 | Comparative Example |
| 15 | L | 10.5 | TM + B | B: 1.0 | 804 | 904 | 297 | 275 | 285 | 270 | 20 | Comparative Example |
| 16 | L | 10.5 | TM + B | B: 1.0 | 797 | 907 | 290 | 280 | 281 | 271 | 0 | Example of this invention |
| 17 | L | 10.5 | TM + B | B: 1.0 | 798 | 903 | 298 | 267 | 282 | 282 | 30 | Comparative Example |
| 18 | L | 12.0 | TM + B | B: 1.0 | 809 | 852 | 278 | 275 | 274 | 268 | 0 | Example of this invention |
| 19 | L | 11.0 | TM + B | B: 1.0 | 835 | 922 | 291 | 276 | 285 | 280 | 0 | Example of this invention |
| 20 | L | 11.0 | TM + B | B: 1.0 | 831 | 927 | 299 | 288 | 294 | 295 | 50 | Comparative Example |
| 21 | M | 10.5 | TM + B | B: 1.0 | 807 | 919 | 289 | 279 | 282 | 269 | 0 | Example of this invention |
| 22 | N | 10.5 | TM + B | B: 1.0 | 802 | 912 | 290 | 275 | 283 | 270 | 0 | Example of this invention |
| 23 | N | 10.5 | TM + B | B: 1.0 | 806 | 910 | 304 | 274 | 286 | 272 | 20 | Comparative Example |
| 24 | N | 10.5 | TM + B | B: 1.0 | 803 | 913 | 300 | 274 | 283 | 268 | 50 | Comparative Example |
| 25 | N | 10.5 | TM + B | B: 1.0 | 801 | 910 | 306 | 276 | 285 | 270 | 60 | Comparative Example |
| 26 | L | 12.0 | TM + B | B: 0.5 | 813 | 850 | 276 | 265 | 271 | 268 | 0 | Example of this invention |

*TM: Tempered martensite, F: ferrite, B: bainite, P: pearlite
**Inner surface side: region at 2.54 to 3.81 mm from the inner surface of the pipe, Outer surface side: region at 2.54 to 3.81 mm from the outer surface of the pipe; Average: arithmetic average of measured values at four portions in the circumferential direction, Maximum: maximum hardness among the measured values at the four portions in the circumferential direction in each of the inner surface side, the center of the thickness, and the outer surface side In any one of the examples of the present invention, the steel pipe has desired high strength (yield strength: 758 MPa or more) and excellent resistance to sulfide stress cracking, and a desired hardness distribution with a maximum hardness of 295 HV10 or less can be secured in the steel pipe. On the other hand, in the comparative examples out of the scope of the present invention, a desired structure, desired high strength, and a desired hardness distribution with a maximum hardness of 295 HV10 or less and/or a desired hardness distribution with a maximum hardness of 295 HV10 or less cannot be secured, and the resistance to sulfide stress cracking is degraded.

The invention claimed is:

1. A seamless steel pipe for oil well use having excellent resistance to sulfide stress cracking, the steel pipe having a composition containing, by mass %:

C: 0.15 to 0.50%, Si: 0.1 to 1.0%,
Mn: 0.3 to 1.0%, P: 0.015% or less,
S: 0.005% or less, Al: 0.01 to 0.1%,
N: 0.01% or less, Cr: 0.1 to 1.7%,
Mo: 0.40 to 1.1%, V: 0.01 to 0.12%,
Nb: 0.01 to 0.08%, Ti: 0.03% or less,
B: 0.0005 to 0.003%, and
the balance composed of Fe and inevitable impurities, and having a structure composed of a tempered martensite phase as a main phase and prior-austenite grains with a grain size number of 8.5 or more,
wherein in four portions 90° apart from each other in the circumferential direction, Vickers hardness HV10 measured with a load of 10 kgf (test force: 98 MPa) is 295 HV10 or less at all three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness;

wherein a wall thickness deviation of the seamless steel pipe is 8% or less.

2. The seamless steel pipe for oil well use according to claim 1, wherein the composition further contains, by mass %, one or two selected from Cu: 1.0% or less, and Ni: 1.0% or less.

3. The seamless steel pipe for oil well use according to claim 1, wherein the composition further contains, by mass %, W: 2.0% or less.

4. The seamless steel pipe for oil well use according to claim 1, wherein the composition further contains, by mass %, Ca: 0.001 to 0.005%.

5. A method for producing a seamless steel pipe for oil well use having excellent resistance to sulfide stress cracking, the method comprising forming a seamless steel pipe with a predetermined shape by hot-working a steel pipe raw material having a composition containing, by mass %, C: 0.15 to 0.50%, Si: 0.1 to 1.0%,
Mn: 0.3 to 1.0%, P: 0.015% or less,
S: 0.005% or less, Al: 0.01 to 0.1%,
N: 0.01% or less, Cr: 0.1 to 1.7%,
Mo: 0.40 to 1.1%, V: 0.01 to 0.12%,
Nb: 0.01 to 0.08%, Ti: 0.03% or less,
B: 0.0005 to 0.003%, and the balance composed of Fe and inevitable impurities;
heating the steel pipe raw material within a range of 1000° C. to 1350° C., cooling the seamless steel pipe to room temperature at a cooling rate equal to or higher than that of air cooling; further quenching, wherein the quenching includes reheating at a quenching temperature within a range of an $Ac_3$ transformation point to 1050° C., holding for 5 minutes or more, and then water cooling at 2° C./s or more, then tempering the seamless steel pipe at a tempering temperature within a range of 630° C. to 730° C., holding for 10 minutes or more and then cooling; and then performing hot straightening within a temperature range of 580° C. or more and a tempering temperature or less to achieve a sectional plasticity rate of 1% or more and less than 10% to produce a seamless steel pipe having a hardness distribution in which in four portions 90° apart from each other in the circumferential direction, Vickers hardness HV10 measured with a load of 10 kgf (test force: 98 MPa) is 295 HV10 or less at all three positions in each of an inner surface-side region at 2.54 to 3.81 mm from the inner surface of the pipe in the thickness direction, an outer surface-side region at 2.54 to 3.81 mm from the outer surface of the pipe in the thickness direction, and a center of the thickness;

wherein the temperature of the steel pipe raw material in a heating furnace for hot working deviates within ±20° C. over the entire circumference and the entire length of the steel pipe raw material; and wherein the temperature of a material to be rolled during hot working deviates within ±50° C. over the entire circumference and the entire length of the material to be rolled.

6. The method for producing a seamless steel pipe for oil well use according to claim 5, wherein the steel pipe raw material is a steel slab formed by hot-rolling a cast slab.

7. The method for producing a seamless steel pipe for oil well use according to claim 5, wherein the quenching and tempering are conducted two times or more.

8. The method for producing a seamless steel pipe for oil well use according to claim 5, wherein instead of the quenching and tempering after reheating, quenching after reheating is conducted two times or more and then tempering is performed.

9. The method for producing a seamless steel pipe for oil well use according to claim 5, wherein the composition further contains, by mass %, at least one group selected from the groups A to C consisting of:

Group A: one or two selected from Cu: 1.0% or less, and Ni: 1.0% or less
Group B: W: 2.0% or less
Group C: Ca: 0.001 to 0.005%.

10. The seamless steel pipe for oil well use according to claim 2, wherein the composition further contains, by mass %, W: 2.0% or less.

11. The seamless steel pipe for oil well use according to claim 2, wherein the composition further contains, by mass %, Ca: 0.001 to 0.005%.

12. The seamless steel pipe for oil well use according to claim 3, wherein the composition further contains, by mass %, Ca: 0.001 to 0.005%.

13. The seamless steel pipe for oil well use according to claim 10, wherein the composition further contains, by mass %, Ca: 0.001 to 0.005%.

14. The method for producing a seamless steel pipe for oil well use according to claim 6, wherein the quenching and tempering are conducted two times or more.

15. The method for producing a seamless steel pipe for oil well use according to claim 6, wherein instead of the quenching and tempering after reheating, quenching after reheating is conducted two times or more and then tempering is performed.

16. The method for producing a seamless steel pipe for oil well use according to claim 7, wherein instead of the quenching and tempering after reheating, quenching after reheating is conducted two times or more and then tempering is performed.

17. The method for producing a seamless steel pipe for oil well use according to claim 14, wherein instead of the quenching and tempering after reheating, quenching after reheating is conducted two times or more and then tempering is performed.

18. The method for producing a seamless steel pipe for oil well use according to claim 6, wherein the composition further contains, by mass %, at least one group selected from the groups A to C consisting of:

Group A: one or two selected from Cu: 1.0% or less, and Ni: 1.0% or less
Group B: W: 2.0% or less
Group C: Ca: 0.001 to 0.005%.

19. The method for producing a seamless steel pipe for oil well use according to claim 7, wherein the composition further contains, by mass %, at least one group selected from the groups A to C consisting of:

Group A: one or two selected from Cu: 1.0% or less, and Ni: 1.0% or less
Group B: W: 2.0% or less
Group C: Ca: 0.001 to 0.005%.

20. The method for producing a seamless steel pipe for oil well use according to claim 14, wherein the composition further contains, by mass %, at least one group selected from the groups A to C consisting of:

Group A: one or two selected from Cu: 1.0% or less, and Ni: 1.0% or less
Group B: W: 2.0% or less
Group C: Ca: 0.001 to 0.005%.

21. The method for producing a seamless steel pipe for oil well use according to claim 8, wherein the composition further contains, by mass %, at least one group selected from the groups A to C consisting of:
Group A: one or two selected from Cu: 1.0% or less, and Ni: 1.0% or less
Group B: W: 2.0% or less
Group C: Ca: 0.001 to 0.005%.

22. The method for producing a seamless steel pipe for oil well use according to claim 15, wherein the composition further contains, by mass %, at least one group selected from the groups A to C consisting of:
Group A: one or two selected from Cu: 1.0% or less, and Ni: 1.0% or less
Group B: W: 2.0% or less
Group C: Ca: 0.001 to 0.005%.

23. The method for producing a seamless steel pipe for oil well use according to claim 16, wherein the composition further contains, by mass %, at least one group selected from the groups A to C consisting of:
Group A: one or two selected from Cu: 1.0% or less, and Ni: 1.0% or less
Group B: W: 2.0% or less
Group C: Ca: 0.001 to 0.005%.

24. The method for producing a seamless steel pipe for oil well use according to claim 17, wherein the composition further contains, by mass %, at least one group selected from the groups A to C consisting of:
Group A: one or two selected from Cu: 1.0% or less, and Ni: 1.0% or less
Group B: W: 2.0% or less
Group C: Ca: 0.001 to 0.005%.

\* \* \* \* \*